United States Patent Office 3,124,562
Patented Mar. 10, 1964

3,124,562
PRODUCTION OF POLYVINYL ALCOHOL
Ryunosuke Naito and Saburo Yamane, Toyama City,
Japan, assignors to Kurashiki Rayon Co., Ltd., Okayama Prefecture, Japan, a corporation of Japan
No Drawing. Filed Apr. 20, 1960, Ser. No. 23,365
Claims priority, application Japan Apr. 23, 1959
4 Claims. (Cl. 260—91.3)

This invention relates to a process for producing water-soluble polyvinyl alcohol having a low degree of polymerization from a polyvinyl ester.

Polyvinyl alcohol is a polymer containing hydroxyl groups and corresponding to the formula:

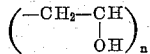

wherein $n$ is an integer which can vary within wide limits, as is well-known in the art. Polyvinyl alcohol can be produced from the corresponding polyvinyl ester, e.g. polyvinyl acetate, by alkaline or acid saponification or ester interchange, i.e. alcoholysis, in accordance with the following equation:

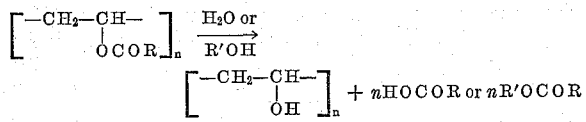

In the following, the foregoing reactions will be referred to generally by the term "saponification" in accordance with conventional practice.

To produce polyvinyl alcohols having a low degree of polymerization, it has been proposed to modify the conditions of polymerization employed in producing the polyvinyl ester from which the polyvinyl alcohol is formed. It has also been proposed to degrade previously-formed polyvinyl alcohols having a high degree of polymerization by means of oxidizers suspended in aqueous solutions of such polyvinyl alcohols. Processes of this nature, which vary the polymerization conditions or which involve uniform or non-uniform degradation of previously-formed polyvinyl alcohols are apparently effective on a laboratory scale but, from the industrial point of view, these systems are not suitable, particularly for the manufacture of polyvinyl alcohols having different degrees of polymerization, when inherent equipment complications and the difficulty of recovering the degraded polyvinyl alcohol are taken into consideration.

It is accordingly an object of the present invention to provide an improved process for producing polyvinyl alcohols having low degress of polymerization.

It is another object of the invention to provide a process of the character indicated which is particularly suitable for industrial application.

In accordance with the invention, polyvinyl alcohols of the desired low degrees of polymerization are directly produced by effecting alkaline saponification of the polyvinly ester, using conventional alkaline saponification catalysts, in the presence of an oxidizing agent such as periodic acid, a periodate, e.g. an alkaline metal or alkaline earth metal periodate, hydrogen peroxide, hypochlorous acid, or a hypochlorite, e.g. an alkali metal or alkaline earth metal hypochlorite. In carrying out this process, breakage of the main chain bond in the vinyl ester polymer is effected simultaneously with conventional saponification of the polyvinyl ester. It is possible with the process of the invention to form, from polyvinyl esters, e.g. polyvinyl lower alkyl esters such as polyvinyl formate, polyvinyl acetate, and polyvinyl butyrate, polyvinyl alcohols having any desired degree of polymerization lower than the degree of polymerization of the polyvinyl alcohols which would be obtained by saponifying the same polyvinyl esters by means of the conventional saponification processes but in the absence of the oxidizing agent. As used herein, the term "low degree of polymerization" means a degree of polymerization of a value ranging between 100 and 1500 when measured by the conventional methods of determining degree of polymerization. Degree of polymerization is, of course, understood to mean the average number of monomer units per polymer molecule.

Saponification in the presence of an oxidizer in accordance with this invention is suitably carried out in a liquid reaction medium which may be any of the solvents for polyvinyl esters which are not affected, or are at most only slightly affected, by the oxidizers employed. Aliphatic alcohols in which polyvinyl alcohol is insoluble, such as lower alkyl alcohols, e.g. methanol, ethanol, and the like, and aqueous solutions of these alcohols, are particularly suitable as reaction media. In the case of aqueous solutions, the amount of water is such that the solubility of the polyvinyl ester in the solvent medium is not destroyed. When such solvents are employed, the product polyvinyl alcohols of desired low degree of polymerization are precipitated in the form of solid masses, thereby greatly facilitating the separation of the product from the reaction medium at the end of the saponification reaction. However, the process of this invention is not applicable in an acidic saponification system but only in an alkaline system, and the process of the invention is preferably carried out in a saponification system comprising an alkaline solution of an aliphatic alcohol. It will be understood, however, that other known solvents for polyvinyl esters are suitably used.

The preferred oxidizers or oxidizing agents used in accordance with the invention are periodic acid and periodates. These compounds are fission agents for the 1,2-glycol bond of low molecular-weight molecules. Moreover, it has been disclosed by Flory that these agents act selectively on the 1,2-glycol bond which occurs in the basic structure of an alcohol at the rate of 1 to 2 mole-percent, to cause fission of the bond. It is our belief that the desired polyvinyl alcohols may be formed by fission of the above-mentioned bond. In the process of this invention, ester groups in the polyvinyl ester molecule are gradually replaced by hydroxyls as the saponification reaction proceeds. However, it has not been cleary ascertained whether the 1,2-glycol bonds formed by chance during the course of saponification are immediately split by the action of the periodic acid or the periodate, or other oxidizing agent, present in the reaction medium, or whether such fission, or fission caused by saponification, simultaneously takes place upon the 1,2-acetyl bonds or the 1,2-acetyl-2-oxy bonds.

However, apart from the theory of the reaction mechanism, saponification accompanied by fission is, in fact, efficiently and effectively accomplished in a single step in accordance with the process of the invention. By suitably regulating the quantity of periodic acid, periodate, or other oxidizer, employed in the alkaline saponification system, the cleavage of bonds can be effected quantitatively upon any desired number of bonds. Thus, to obtain greater cleavage and lower degrees of polymerization, greater amounts of oxidizer are employed, and lesser amounts of oxidizer effect less cleavage, and higher degrees of polymerization in the product polyvinyl acohol are obtained. Generally speaking, at least about 0.34 mole-percent of oxidizer is employed, based on the polyvinyl ester molecule subjected to saponification. The quantity of oxidizer will, of course, vary with the degree of polymerization of the polyvinyl ester saponified and with the degree of polymerization desired in the product polyvinyl alcohol. The quantity for any specific combination of degrees of polymerization can be readily determined by routine test by persons skilled in this art. In this manner, polyvinyl alcohols having any desired low degree of polymerization can be directly and efficiently obtained. Moreover, it has been discovered that the cleavage reaction is not affected to any appreciable extent by the conditions of saponification, such as the saponifying temperature, the concentration of the polyvinyl ester in the reaction medium, the composition of the solvent, the nature and quantity of the alkaline catalyst, and the like. Accordingly, the process of this invention is readily integrated with any of the conventional alkaline saponification processes although, as mentioned, the use of an alcohol as solvent, more particularly an aqueous alcohol solution, and an alkali metal hydroxide catalyst, are preferably employed. It has been found that saponification in the presence of an oxidizer for about two minutes will generally suffice to bring about fission of the polyvinyl ester so that polyvinyl alcohols having desired low degrees of polymerization can be advantageously produced.

Because the periodates are generally less soluble, it is preferable to use periodic acid when producing a polyvinyl alcohol having a degree of polymerization at the lower end of the above-mentioned range. Furthermore, in this case, since periodic acid reacts quantitatively, no unreacted periodic acid remains in the reaction medium when the reaction is complete. In addition, iodic acid, which is a byproduct of the reaction, will be converted into an iodate by the action of the alkali used as the saponification catalyst. For this reason, the iodic acid will not act as a catalyst of the acetal reaction. Accordingly, the resultant polyvinyl alcohol will not become insoluble when subjected to drying and other treatments. Consequently, there will be produced a polyvinyl alcohol having good water solubility.

However, as mentioned above, in addition to periodic acid and periodates, hydrogen peroxide, hypochlorous acid, and hypochlorites can be used as oxidizers. All of the last-named compounds are, however, rather powerful oxidizers and when any of them is present in the saponification system, the main chain bond of the resultant polyvinyl alcohol may, on occasion, be broken irregularly. The action of these agents is thus less smooth than that of periodic acid. Nevertheless, polyvinyl alcohols having a desired low degree of polymerization can be satisfactorily obtained with these latter oxidizing agents as well as with periodic acid and periodates, and there can be produced a polyvinyl alcohol with excellent water-solubility and resistance to discoloration upon being subjected to drying and other treatment by employing appropriate quantities of the oxidizer in combination with the usual saponification operation.

Moreover, the process of the present invention is applicable not only to the production of fully-saponified polyvinyl alcohol but also to the production of partially saponified polyvinyl alcohol containing residual ester groups.

The invention will be further understood from the following specific examples of practical application. However, it will be understood that these examples are not to be construed as limiting the scope of the present invention in any manner. In the examples, all parts are by weight unless otherwise indicated.

*Example 1*

Five parts of polyvinyl acetate having a degree of polymerization of 1450 was dissolved in 50 parts of a 5% aqueous solution of ethanol in which 0.045 part of periodic acid (0.34 mole-percent based on the polyvinyl acetate molecule) was also dissolved. The resultant solution was saponified at a temperature of 40° C. by adding 2 parts of an aqueous solution of caustic soda having a concentration of 260 g. per liter. After the saponification reaction was complete, the precipitated polyvinyl alcohol was separated by filtration, and the separated polyvinyl alcohol was washed with a small amount of ethanol, and then dried. The polyvinyl alcohol obtained had a degree of polymerization of 530. No discoloration of the product was noted after drying for a period of 5 hours at 80° C. Moreover, the product was satisfactorily soluble in water.

*Example 2*

Ten parts of polyvinyl acetate having a degree of polymerization of 1950 and 0.15 part of periodic acid (0.57 mole-percent based on the polyvinyl acetate molecule) were dissolved in 40 parts of a 20% aqueous solution of methanol. The polyvinyl acetate in the solution was saponified at 20° C. by adding 2 parts of an aqueous solution of caustic soda having a concentration of 260 g. per liter. The degree of polymerization of the resultant polyvinyl alcohol was 410, and the solubility in water of this polyvinyl alcohol was excellent.

*Example 3*

Ten parts of polyvinyl acetate having a degree of polymerization of 1950 were dissolved in 40 parts of a 5% aqueous solution of methanol. The polyvinyl acetate in the solution was subjected to saponification at 50° C. by adding to the polymer solution 7 parts of a 1 N aqueous solution of caustic soda and 2 parts of an aqueous solution of periodic acid, the periodic acid being used in the amount of 0.57 mole percent based on the polyvinyl acetate molecule. The properties of the resultant polyvinyl alcohol were similar to those of the product obtained in Example 2.

*Example 4*

One part of polyvinyl butyrate having a degree of polymerization of 850 was dissolved in 15 parts of methanol in which 0.01 part of periodic acid (0.5 mole-percent based on the polyvinyl butyrate molecule) was dissolved. The polymer in the solution was saponified at 30° C. with the addition of 0.5 part of caustic soda to the methanol solution. The polyvinyl alcohol which precipitated was separated by filtration and the separated polyvinyl alcohol was washed with a small quantity of methanol. The product polyvinyl alcohol had a degree of polymerization of 360.

*Example 5*

Three parts of polyvinyl acetate having a degree of polymerization of 1950 were dissolved in 50 parts of a 10% aqueous solution of methanol. Five parts of a saturated aqueous solution of calcium hypochlorite were added to the polymer solution and the two solutions uniformly blended. Saponification of the polymer in the blended solution was effected by incorporating 2 parts of an aqueous solution of caustic soda having a concentration of 260 g. per liter. The polyvinyl alcohol obtained was colorless and had a degree of polymerization of 780 and excellent solubility in water.

It will be understood that, unless otherwise indicated, conventional operations and conventional apparatus are suitably employed in carrying out the process of this invention, including conventional mixing and saponifying units. The conditions and relative relationships set forth in the examples are those preferred in carrying out the process of the invention but it will be understood that other conditions and relationships may be used within the scope of the invention.

It will also be understood that various changes and modifications may be made in the embodiments described above without departing from the scope of the invention as defined in the appended claims. As previously mentioned, for example, it is intended that the oxidizers described above be combined, in accordance with the invention, with known saponification processes and techniques. In this connection, reference is suitably made, for example to Bristol U.S. Patent 2,700,035, Waugh et al. U.S. Patent 2,642,419 and Germain U.S. Patent 2,643,994. Of particularly suitability are the process techniques and apparatus described in the copending application of Tsuguo Kominami, Serial No. 862,626, filed December 29, 1959.

It is intended, therefore, that all matter contained in the foregoing description shall be interpreted as illustrative only and not as limitative of the invention.

We claim:

1. A process of producing a polyvinyl alcohol having a degree of polymerization of about 100 to 1500 from a polyvinyl ester which comprises simultaneously saponifying and degrading said ester in an alkaline medium containing an alkaline saponification catalyst and a small but effective amount of an oxidizer selected from the group consisting of periodic acid, alkali metal periodates and alkaline earth metal periodates, and recovering polyvinyl alcohol having a degree of polymerization which is in the range of about 100 to 1500 and lower than the degree of polymerization of polyvinyl alcohol produced by alkaline saponification of said ester in the absence of any oxidizer.

2. A process according to claim 1 wherein said oxidizer is periodic acid.

3. A process according to claim 1 wherein said oxidizer is an alkali metal periodate.

4. A process of producing a polyvinyl alcohol of reduced degree of polymerization from a polyvinyl ester which comprises saponifying said ester in a liquid alkaline medium which is a solvent for said polyvinyl ester, said liquid alkaline medium containing alkaline saponification catalyst and a small but effective amount of an oxidizer selected from the group consisting of periodic acid, alkali metal periodates and alkaline earth metal periodates, the degree of polymerization of said polyvinyl alcohol being less than 1500 and being substantially lower than the degree of polymerization of polyvinyl alcohol produced by said alkaline saponification of said ester in the absence of any oxidizer.

References Cited in the file of this patent
UNITED STATES PATENTS

| | | |
|---|---|---|
| 2,642,420 | Kenyon et al. | June 16, 1953 |
| 2,668,810 | Bergmeister | Feb. 9, 1954 |